US012699661B2

(12) United States Patent
Lai

(10) Patent No.: US 12,699,661 B2
(45) Date of Patent: Aug. 4, 2026

(54) CONSUMER ELECTRONICS CONTROL SYSTEM AND ELECTRONIC SYSTEM CONTROL METHOD

(71) Applicant: Realtek Semiconductor Corp., HsinChu (TW)

(72) Inventor: Chao-Min Lai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/791,371

(22) Filed: Jul. 31, 2024

(65) Prior Publication Data

US 2025/0045222 A1 Feb. 6, 2025

(30) Foreign Application Priority Data

Aug. 1, 2023 (TW) ................................. 112128768

(51) Int. Cl.
*G06F 13/20* (2006.01)
*H04N 21/4363* (2011.01)
(52) U.S. Cl.
CPC ....... *G06F 13/20* (2013.01); *H04N 21/43635* (2013.01); *G06F 2213/40* (2013.01)

(58) Field of Classification Search
CPC ................ G06F 13/20; G06F 2213/40; H04N 21/43635; H04N 21/42225; H04N 21/42226
See application file for complete search history.

(56) References Cited

U.S. PATENT DOCUMENTS

| | | | | |
|---|---|---|---|---|
| 2008/0062319 A1* | 3/2008 | Hsieh | ................. | H04N 21/4316 |
| | | | | 348/E9.037 |
| 2009/0261896 A1* | 10/2009 | Tzu-Chien | ......... | H03K 19/0016 |
| | | | | 327/543 |
| 2010/0157169 A1* | 6/2010 | Yoshida | ................. | H04N 5/775 |
| | | | | 348/734 |
| 2017/0293584 A1* | 10/2017 | Satheesh | ............. | G06F 13/4022 |
| 2018/0286346 A1* | 10/2018 | Castano | ........... | H04N 21/42204 |
| 2021/0352377 A1* | 11/2021 | Chen | ................. | H04N 21/6106 |

* cited by examiner

*Primary Examiner* — Farley Abad
(74) *Attorney, Agent, or Firm* — Winston Hsu

(57) ABSTRACT

A CEC system, comprising: a first IC, comprising a first pin and an anti-leakage circuit electrically coupled to the first pin; and a second IC, comprising a second pin electrically coupled to the first pin. The first IC or the second IC is configured to provide a CEC function. Thereby software can be used to simulate CEC functions to increase the number of CEC function sets without increasing hardware costs, to increase the application scope of the CEC system.

15 Claims, 5 Drawing Sheets

CONSUMER ELECTRONICS CONTROL SYSTEM AND ELECTRONIC SYSTEM CONTROL METHOD

BACKGROUND OF THE INVENTION

1. Field of the Invention

The present invention relates to a CEC (Consumer Electronics Control) system and an electronic system control method, and particularly relates to a CEC system and an electronic system control method which can simulate CEC functions by software without increasing hardware cost.

2. Description of the Prior Art

A conventional CEC is an electronic device control method that allows users to control various devices through a transmission interface using only one remote control. For example, users can use the TV remote control to control all devices connected to the TV through HDMI (High Definition Multimedia Interface). For another example, the user uses a TV remote control to control a set-top box or a DVD player connected to the TV. A set of CEC functions can usually only control the same electronic device, so conventional CEC systems often need to provide multiple sets of CEC functions to meet the user's needs. However, if the number of CEC function sets is desired to be increased, the hardware of the CEC system is increased accordingly, which will significantly increase the cost of the hardware.

SUMMARY OF THE INVENTION

One objective of the present invention is to provide a CEC system which can simulate CEC functions to increase the number of CEC function sets without increasing hardware costs.

Another objective of the present invention is to provide a CEC system which can simulate CEC functions to increase the number of CEC function sets without increasing hardware costs.

One embodiment of the present invention discloses a CEC system, comprising: a first IC, comprising a first pin and an anti-leakage circuit electrically coupled to the first pin; and a second IC, comprising a second pin electrically coupled to the first pin. The first IC or the second IC is configured to provide a CEC function.

Another embodiment of the present invention discloses an electronic device control system, comprising: a first IC, comprising a first pin and an anti-leakage circuit electrically coupled to the first pin; and a second IC, comprising a second pin electrically coupled to the first pin. The first IC or the second IC is configured to provide an electronic system control function.

In view of the foregoing embodiments, software can be used to simulate CEC functions to increase the number of CEC function sets without increasing hardware costs, thereby increasing the application scope of the CEC system.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term "first", "second", "third" in following descriptions are only for the purpose of distinguishing different one elements, and do not mean the sequence of the elements. For example, a first device and a second device only mean these devices can have the same structure but are different devices.

Figure 1:
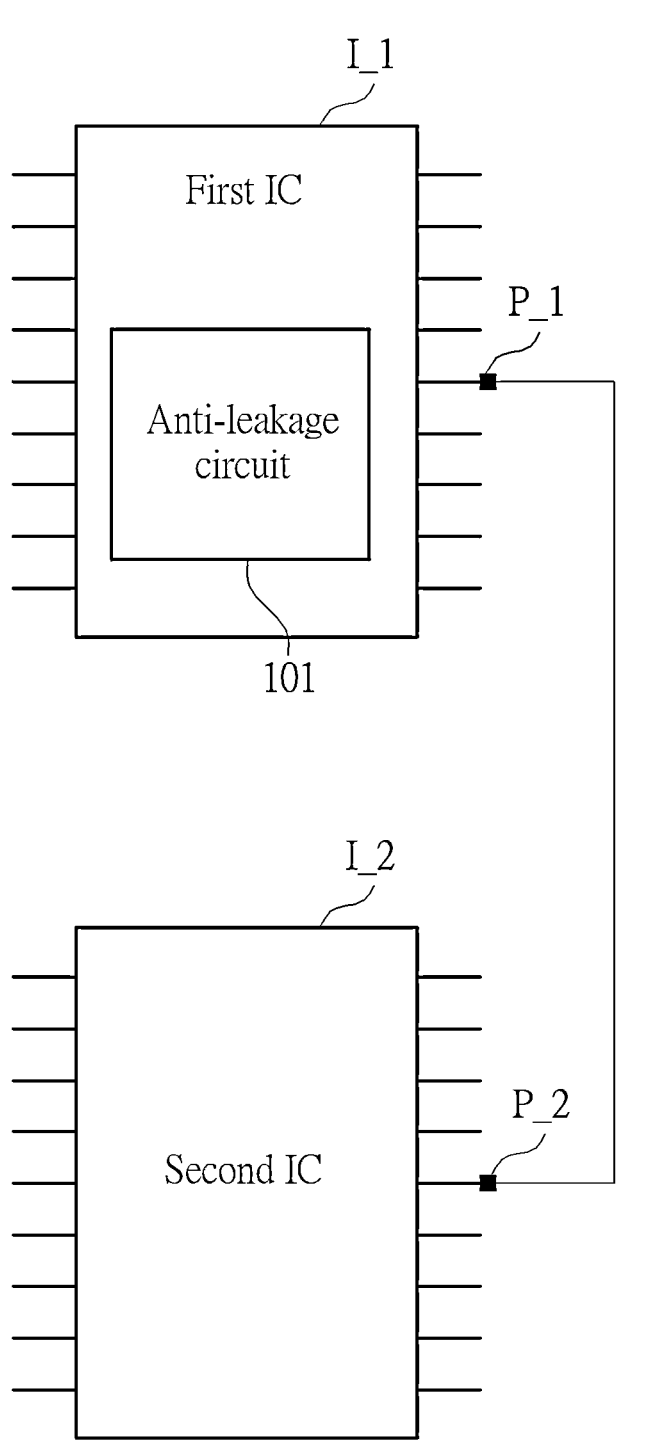
FIG. 1 is a block diagram illustrating a CEC system according to one embodiment of the present invention.

FIG. 1 is a block diagram illustrating a CEC system according to one embodiment of the present invention. As shown in FIG. 1, the CEC system 100 comprises a first IC I_1 and a second IC I_2. The first IC I_1 comprises a first pin P_1 and an anti-leakage circuit 101. The anti-leakage circuit 101 is electrically coupled to the first pin P_1. That is, other electronic components may exist between the anti-leakage circuit 101 and the first pin P_1. The second IC I_2 comprises a second pin P_2. The second pin P_2 is electrically coupled to the first pin P_1. That is, other electronic components may exist between the second pin P_2 and the first pin P_1. In one embodiment, the second pin P_2 is directly electrically connected to the first pin P_1, that is, there is no electronic component between the second pin P_2 and the first pin P_1. However, please note that the number of pins of the first IC I_1, the position of the first pin P_1, the number of pins of the second IC I_2 and the position of the second pin P_2 are not limited to those examples shown in figures of the present invention.

Both the first IC I_1 and the second IC I_2 can be used to provide CEC functions. In the following embodiments, the first IC I_1 is an OTT (Over The Top Media Service) driving IC, and the second IC is a GPIO (General Purpose Input/Output) IC. However, the first IC I_1 and the second IC I_2 may also be other ICs that can provide CEC functions. The first IC IC_1 and the second IC IC_2 may be located on the same SOC (System on chip). The first pin P_1 and the second pin P_2 may be disposed on the circuit board and be electrically coupled through wires on the circuit board or directly electrically connected.

In one embodiment, the first IC I_1 does not provide CEC functions, and the second IC I_2 provides at least two sets of CEC functions (two sets in this embodiment) by software. In another embodiment, the first IC I_1 provides at least one set of CEC function (one set in this embodiment), and the second IC I_2 provides at least one set of CEC function (one set in this embodiment) by software. The first IC I_1 has a specific hardware structure for providing the CEC function, such as a logic circuit, active components and passive components for providing the CEC function. The first IC I_1 does not need to simulate the CEC function by executing software. The second IC I_2 simulates the function of CEC by software. For example, the second IC I_2 uses software to simulate communication between different electronic devices when the CEC function is executed. For example, U.S. Pat. No. 10,680,846 discloses using GPIO to simulate communication between different electronic devices when the CEC function is executed. Compared with OTT driving ICs, GPIO has a simpler hardware structure and lower cost. Therefore, through this approach, multiple sets of CEC functions can be provided with less hardware cost.

A set of CEC functions here can be used to control different electronic devices. The electronic device may have multiple functions or a single function. For example, if the CEC system 100 is used on an audio-visual device, and the audio-visual device comprises an independent image display device and an audio playback device, then the audio-visual device requires two sets of CEC functions. However, if the image display device and audio playback device of the audio-visual device are integrated into the same electronic device, the audio-visual device can only use one set of CEC functions. That is to say, in this embodiment, the first IC I_1 or the second IC I_2 is used to provide at least one set of CEC function for image displaying and at least one set of CEC function used for audio playback.

As mentioned above, the second IC I_2 simulates communication between different electronic devices by software when the CEC function is executed. Therefore, when the second IC I_2 is a GPIO, its circuit structure will be limited and may lack some electronic components or circuits with specific purposes. In the embodiment shown in FIG. 1, the second IC I_2 lacks an anti-leakage circuit. However, if other anti-leakage circuits are added to the first IC I_1 and the second IC I_2, the circuit area and the hardware cost will be increased. As mentioned above, the anti-leakage circuit 101 is electrically coupled to the first pin P_1 of the first IC I_1, so the second pin P_2 is electrically coupled to the first pin P_1, thereby the second IC I_2 may use the anti-leakage circuit 101 of the first IC I_1. By this way, the number of CEC function sets can be increased without increasing the hardware cost of the anti-leakage circuit.

Figure 2:
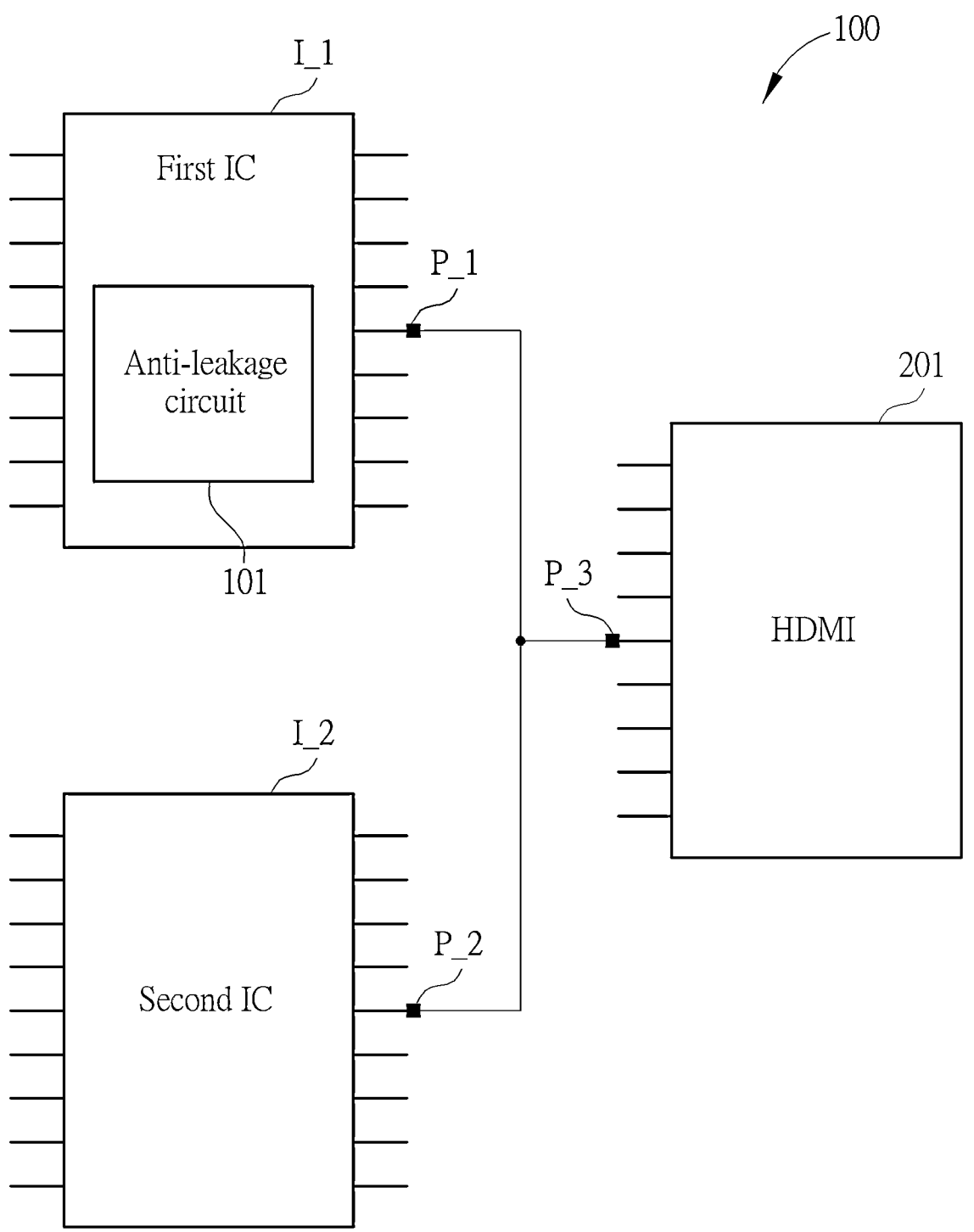
FIG. 2 is a block diagram illustrating a CEC system according to another embodiment of the present invention.

The CEC system 100 in FIG. 1 may further comprise other electronic devices. FIG. 2 illustrates a block diagram of a CEC system according to another embodiment of the present invention. As shown in FIG. 2, in addition to the first IC I_1 and the second IC I_2 shown in FIG. 1, the CEC system 100 further comprises an HDMI (High Definition Multimedia Interface, High Definition Multimedia Interface) 201, which comprises an The third pin is P_3. In one embodiment, the first pin P_1 of the first IC I_1 and the second pin P_2 of the second IC I_2 are electrically coupled to the third pin P_3 of the HDMI 201, that is, the first pin P_1, the second pin P_2 of the second IC I_2 are electrically coupled together. Other components can be placed between the second pin P_2 and the third pin P_3. In one embodiment, the first pin P_1 and the second pin P_2 are directly electrically connected to the third pin P_3, that is, there is no connection between the first pin P_1, the second pin P_2 and the third pin P_3. other components. In the embodiment of FIG. 2, the first IC_1 and the second IC_2 comply with the HDMI specification to perform the CEC function, and the circuit characteristics of the anti-leakage circuit 101 also comply with the HDMI specification. For example, the impedance or the anti-leakage performance of the anti-leakage circuit 101 complies with HDMI specifications. However, in one embodiment, the first IC_1 and the second IC_2 are not connected to HDMI and do not follow HDMI specifications to perform the CEC function, and the circuit characteristics of the anti-leakage circuit 101 do not follow HDMI specifications. In this case, the CEC system 100 can be regarded as an electronic device control system that allows the user to control multiple electronic devices connected to the target electronic device through the remote control of a single target electronic device.

Figure 3:
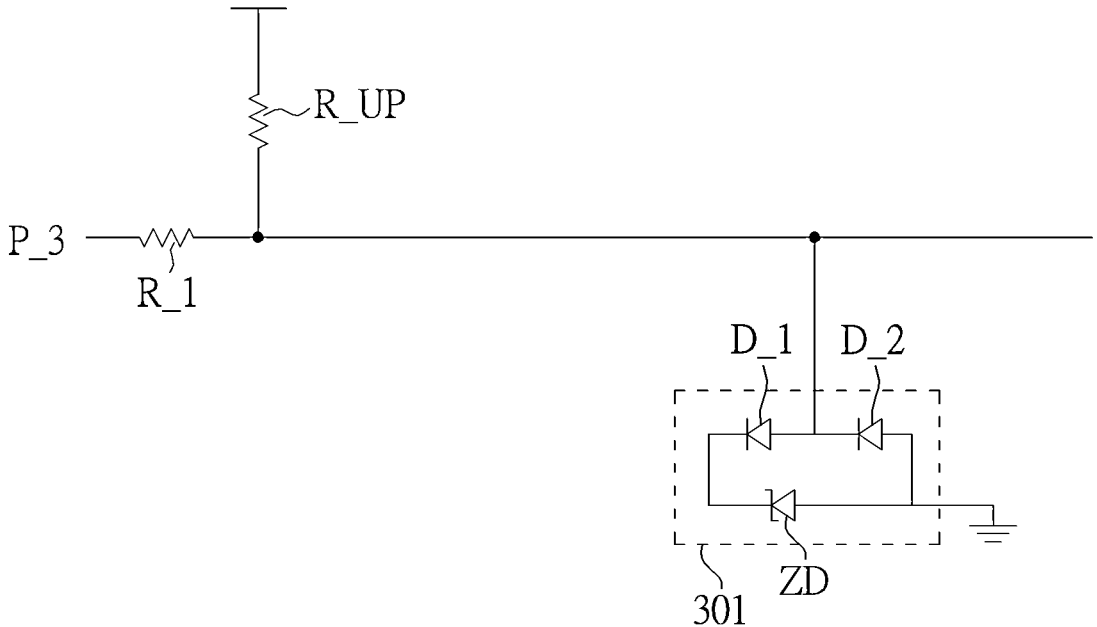
FIG. 3 is a circuit diagram illustrating anti-leakage circuits in FIG. 1 and FIG. 2, according to one embodiment of the present invention.

The anti-leakage circuit 101 in the aforementioned first IC I_1 can be composed of various circuits. In one embodiment, the anti-leakage circuit 101 is a pull-up resistor. FIG. 3 is a circuit diagram illustrating anti-leakage circuits in FIG. 1 and FIG. 2, according to one embodiment of the present invention. As shown in FIG. 3, the anti-leakage circuit 101 is a pull-up resistor R_UP, which can be electrically coupled to other components according to different designs. For example, in the embodiment of FIG. 3, the anti-leakage circuit 101 is further electrically coupled to a resistor R_1 and a protection circuit 301. The resistance of resistor R_1 is much smaller than the pull-up resistor R_UP. For example, in one embodiment, the resistance of the resistor R_1 is 100 ohms and the resistance of the pull-up resistor R_UP is 27K ohms. The protection circuit 301 may comprise various circuit structures. In the example of FIG. 3, the protection circuit 301 comprises a plurality of diodes D_1, D_2 and a zener diode ZD, but is not limited thereto. However, please note that the anti-leakage circuit 101 is not limited to the example shown in FIG. 3, and may have different circuit structures corresponding designs to different or applications.

Figure 4:
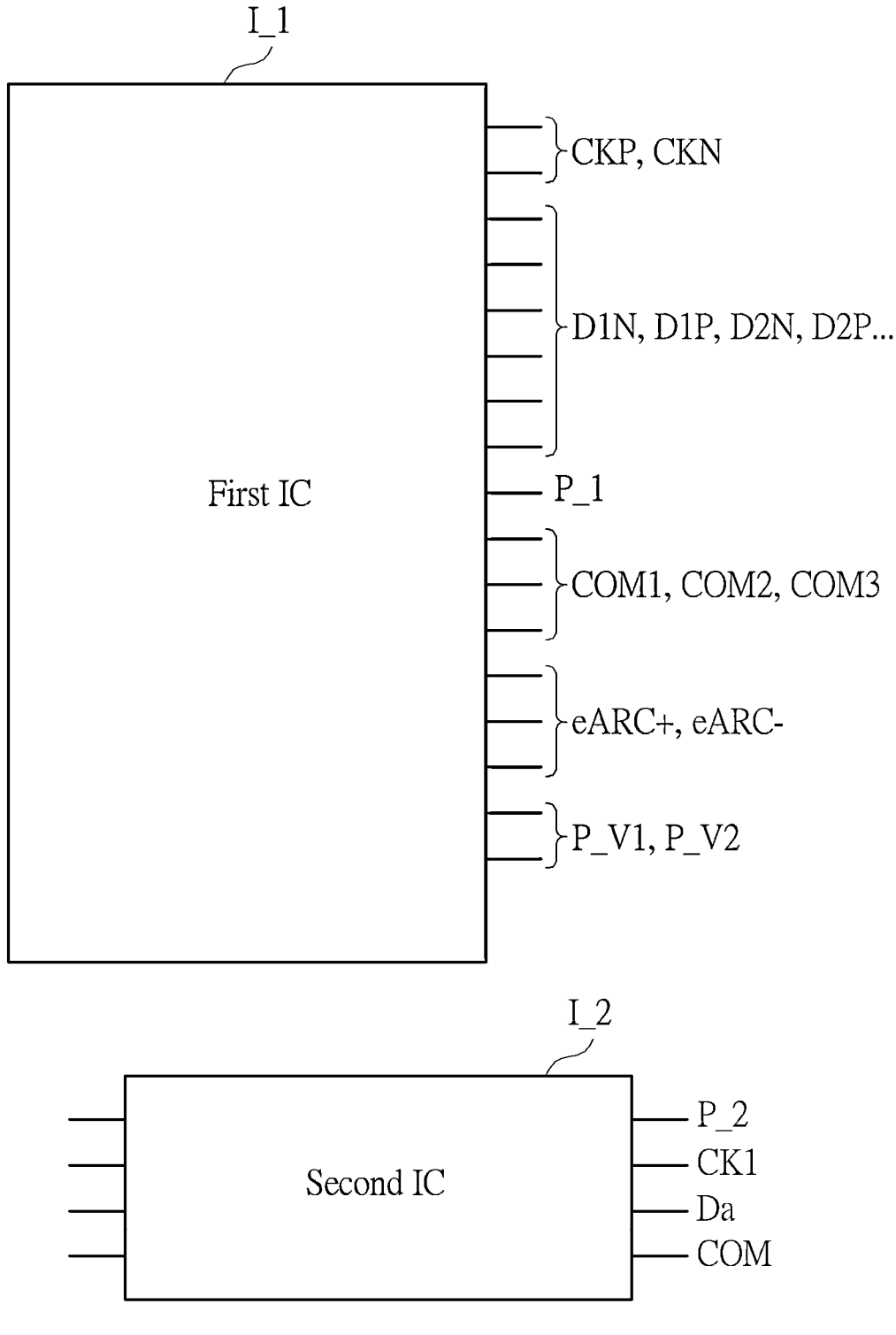
FIG. 4 is a circuit diagram illustrating a first IC and a second IC in FIG. 1 and FIG. 2, according to one embodiment of the present invention.

The first IC I_1 and the second IC I_2 shown in FIGS. 1 and 2 may further comprise other pins. FIG. 4 is a circuit diagram illustrating a first IC and a second IC in FIG. 1 and FIG. 2, according to one embodiment of the present invention. As shown in FIG. 4, in addition to the first pin P_1, the first IC I_1 also comprises clock pins CKP and CKN, data pins D1N, D1P, D2N, D2P, and communication pins COM1, COM2, COM3, audio pins eARC+, eARC− and voltage pins P_V1, P_V2. The clock pins CKP and CKN are used to receive clock signals. The data pins D1N, D1P, D2N and D2P are used to receive data. The communication pins COM1, COM2 and COM3 are used to communicate with other ICs or electronic devices. The audio pins eARC+ and eARC− are used to receive audio signals returned from outside, while the voltage pins P_V1 and P_V2 are used to receive different operating voltages.

In addition to the aforementioned second pin P_2, the second IC I_2 also comprises a clock pin CK1, a data pin Da and a communication pin COM. In one embodiment, the communication pin COM is a MOSI (Master Output, Slave Input) pin. However, please note that the pin positions of the first IC I_1 and the second IC_2 are not limited to the foregoing embodiments, and may vary according to different designs.

Figure 5:
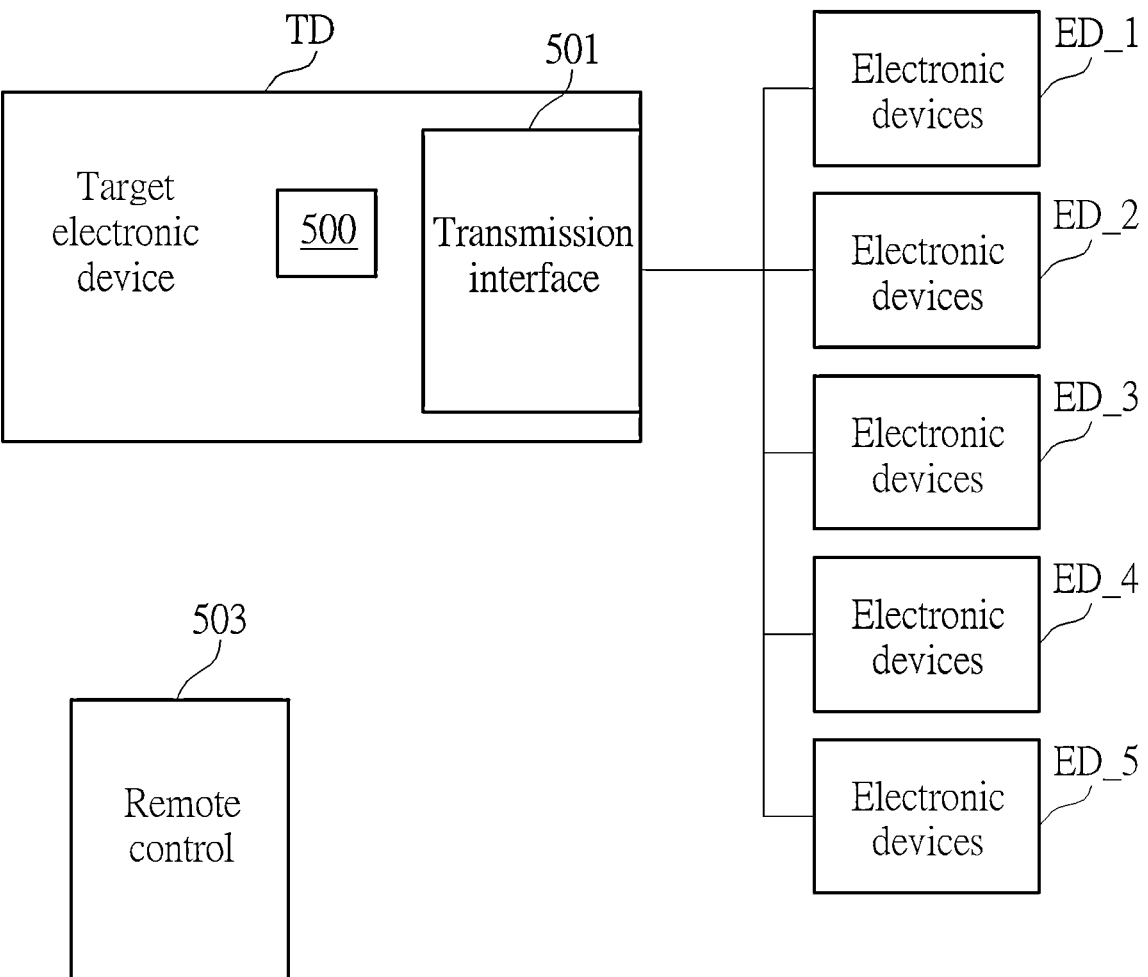
FIG. 5 is a schematic diagram illustrating a target electronic system which uses an electronic device control system provided by the present invention, according to one embodiment of the present invention.

As mentioned above, the CEC system 100 can be regarded as an electronic device control system, which allows the user to control multiple electronic devices connected to the target electronic device through the remote control of a single target electronic device. FIG. 5 is a schematic diagram illustrating a target electronic system which uses an electronic device control system provided by the present invention, according to one embodiment of the present invention. As shown in FIG. 5, the target electronic device TD comprises an electronic device control system 500 and a transmission interface 501. The electronic devices ED_1, ED_2, ED_3, ED_4 and ED_5 are connected to the transmission interface 501. The electronic device control system 500 comprises the first IC I_1 and the second IC I_2 shown in FIG. 1, so it can provide an electronic device control function, allowing the user to control electronic devices ED_1, ED_2, ED_3, ED_4 and ED_5 through the remote control 503 of the target electronic device TD.

In one embodiment, the target electronic device TD is a television, the transmission interface 501 is an HDMI, and the remote control 503 is a television remote control. In this example, the electronic device control system 500 can provide the aforementioned CEC function, and the electronic devices ED_1, ED_2, ED_3, ED_4, and ED_5 can be various audio-visual devices, such as DVD players, speakers, and set-top boxes. In one embodiment, one of the electronic devices ED_1, ED_2, ED_3, ED_4 and ED_5 is an OTT set-top box. The OTT set-top box may comprise independent video display devices and audio playback devices. In such example, the electronic device control system 500 must provide multiple sets of CEC functions to the OTT set-top box. As mentioned above, the multiple sets of CEC functions can be provided by the first IC I_1 and the second IC I_2 together, or only provided by the second IC I_2.

In view of the foregoing embodiments, software can be used to simulate CEC functions to increase the number of CEC function sets without increasing hardware costs, thereby increasing the application scope of the CEC system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A CEC (Consumer Electronics Control) system, comprising:
   a target electronic device;
   a first IC, comprising a first pin and an anti-leakage circuit electrically coupled to the first pin; and
   a second IC, comprising a second pin electrically coupled to the first pin;
   wherein the first IC or the second IC is configured to provide a CEC function;
   wherein the first IC and the second IC are disposed on a circuit board of the target electronic device;
   wherein the first IC or the second IC is configured to provide at least one of the CEC function for image displaying and at least one of the CEC function for audio playback.

2. The CEC system of claim 1, wherein the anti-leakage circuit is a pull-up resistor.

3. The CEC system of claim 1, wherein the first pin is directly and electrically coupled to the second pin.

4. The CEC system of claim 1, wherein the first IC is an Over The Top Media Service driving IC, and the second IC is a General Purpose Input Output IC.

5. The CEC system of claim 4, wherein the first IC does not provide the CEC function, and the second IC provides at least two sets of the CEC functions by software.

6. The CEC system of claim 4, wherein the first IC provides at least one set of the CEC function, and the second IC provides at least one set of the CEC function by software.

7. The CEC system of claim 1, further comprising a HDMI (High Definition Multimedia Interface), wherein the first pin and the second pin are electrically coupled to a third pin of the HDMI.

8. The CEC system of claim 7, wherein the first pin and the second pin are directly and electrically coupled to the third pin.

9. An electronic device control system, comprising:
   a target electronic device;
   a first IC, comprising a first pin and an anti-leakage circuit electrically coupled to the first pin; and
   a second IC, comprising a second pin electrically coupled to the first pin;
   wherein the first IC or the second IC is configured to provide an electronic system control function;
   wherein the first IC and the second IC are disposed on a circuit board of the target electronic device;
   wherein the target electronic device is connected to a plurality of electronic devices, wherein the first IC or the second IC are configured to provide the electronic system control function, thereby the electronic devices may be controlled by a remote control corresponding to the target electronic device.

10. The electronic device control system of claim 9, wherein the anti-leakage circuit is a pull-up resistor.

11. The electronic device control system of claim 9, wherein the first pin is directly and electrically coupled to the second pin.

12. The electronic device control system of claim 9, wherein the first IC is an Over The Top Media Service driving IC, and the second IC is a General Purpose Input Output IC.

13. The electronic device control system of claim 12, wherein the first IC does not provide the electronic system control function, and the second IC provides at least two sets of the electronic system control functions by software.

14. The electronic device control system of claim 12, wherein the first IC provides at least one set of the electronic system control function, and the second IC provides at least one set of the electronic system control function by software.

15. The electronic device control system of claim 9, wherein the first IC or the second IC is configured to provide at least one of the electronic system control function for image displaying and at least one electronic system control function for audio playback.

\* \* \* \* \*